W. H. BEES.
APPARATUS FOR DELIVERING LIQUID UNDER PRESSURE.
APPLICATION FILED FEB. 25, 1913.
1,084,061.    Patented Jan. 13, 1914.
3 SHEETS—SHEET 1.
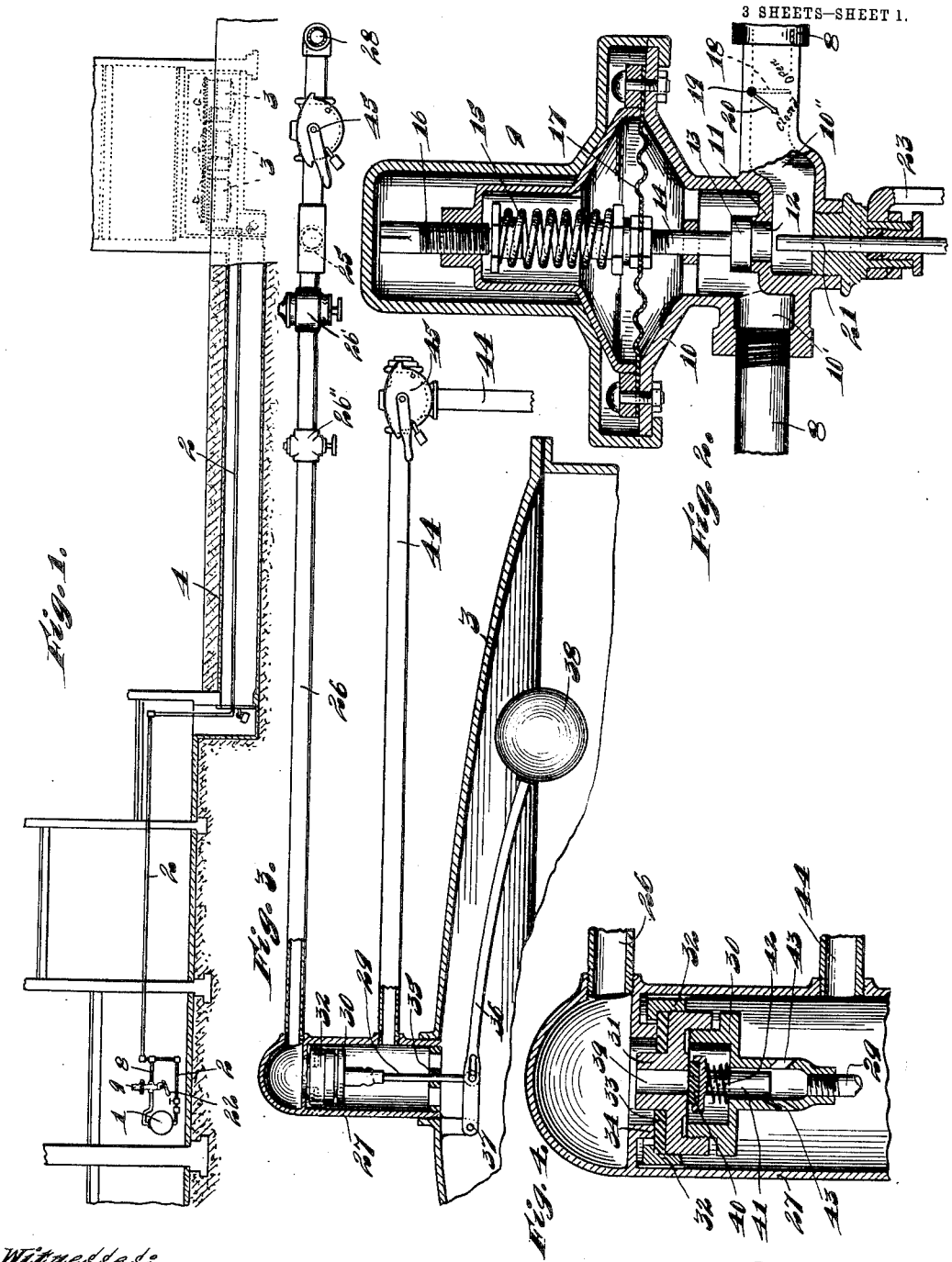

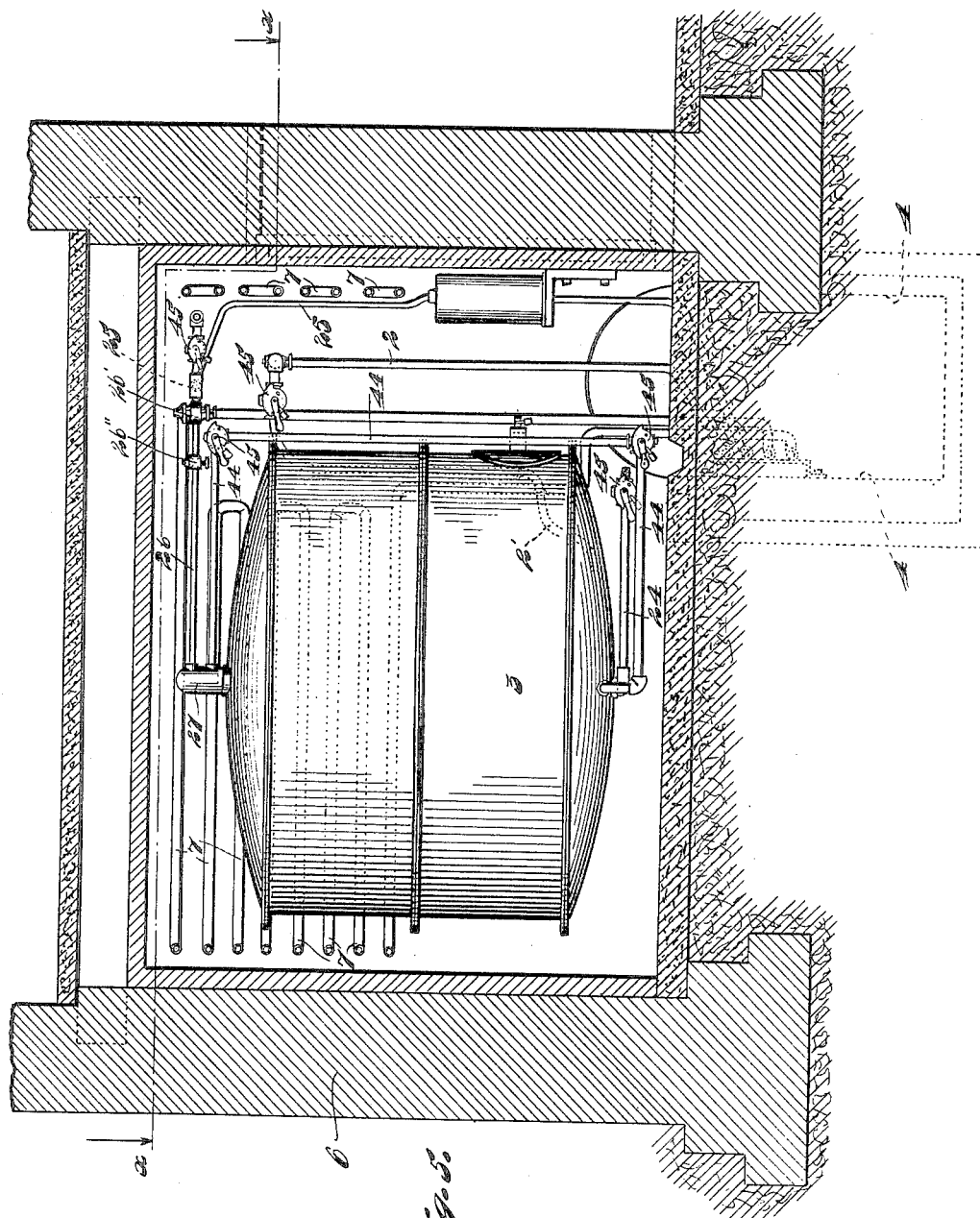

W. H. BEES.
APPARATUS FOR DELIVERING LIQUID UNDER PRESSURE.
APPLICATION FILED FEB. 25, 1913.
1,084,061.
Patented Jan. 13, 1914.
3 SHEETS—SHEET 3.
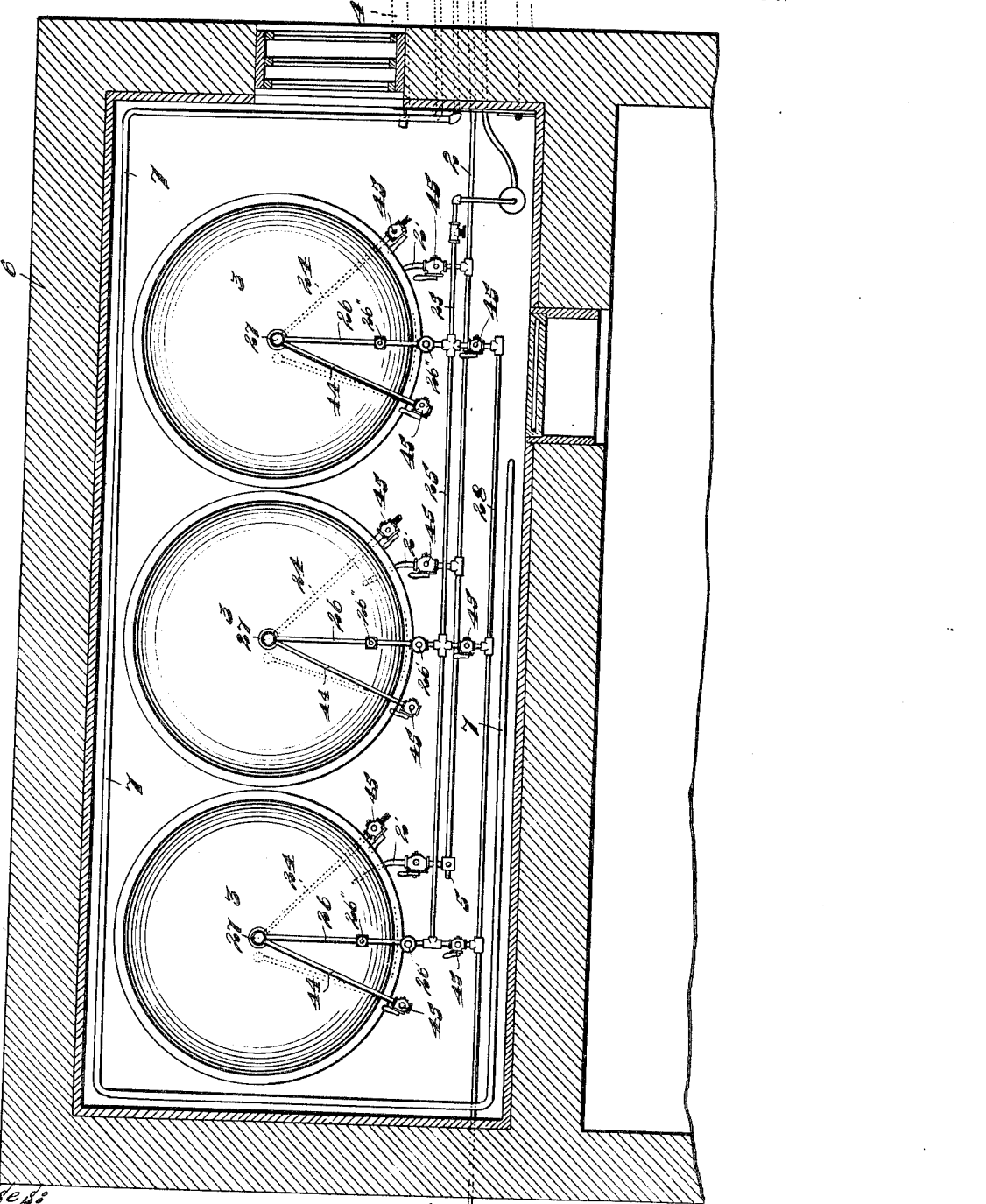

UNITED STATES PATENT OFFICE.

WILLIAM H. BEES, OF CHICAGO, ILLINOIS, ASSIGNOR OF ONE-HALF TO ADOLPH STRAKA, OF CHICAGO, ILLINOIS.

APPARATUS FOR DELIVERING LIQUID UNDER PRESSURE.

1,084,061.          Specification of Letters Patent.      Patented Jan. 13, 1914.

Application filed February 25, 1913. Serial No. 750,589.

*To all whom it may concern:*

Be it known that I, WILLIAM H. BEES, a citizen of the United States, and a resident of the city of Chicago, county of Cook, and State of Illinois, have invented certain new and useful Improvements in Apparatus for Delivering Liquid Under Pressure, of which the following is a specification.

My invention relates to apparatus for delivering liquid under pressure and more specifically to apparatus used in breweries for delivering beer from the filter to the beer cisterns.

At the present time the law requires that the filter and the beer cisterns must be located in different buildings, the two buildings in which said filter and cisterns are located being connected only through the medium of a tunnel through which the beer conducting pipes pass. Also, at the present time the valve governing the flow of the beer through the pipe leading from the filter to the cisterns is located in the building containing the filter. This being so, when the cisterns are filled, the man in charge of the cisterns, is required to telephone or otherwise communicate with the man in charge of the filter and valve in order to notify him of the fact that the cisterns are filled and that he must shut off the supply of beer. If the man at the cistern neglects his duty, the beer continues to flow, after filling of the cisterns, causing overflowing of the latter into the air pressure and relief pipes and not infrequently the bursting of the cisterns by reason of the increasing of the pressure in the cisterns through the forcing of beer thereinto.

It is the object of this invention to provide apparatus in which the overflowing of the beer cisterns, as above mentioned, will be impossible, and in which the possibility of increasing the pressure in the cisterns to such an extent as to cause bursting of the latter, will be obviated.

A further object is the production of apparatus as mentioned, which will be of durable and economical construction and efficient in use.

Other objects will appear hereinafter.

The invention consists in the combinations and arrangements of parts hereinafter described and claimed.

The invention will be best understood by reference to the accompanying drawings forming a part of this specification, and in which, Figure 1 is a sectional partially diagrammatic view of a beer delivering apparatus embodying my invention, Fig. 2 is an enlarged central section of one of the relief valves included in the apparatus, Fig. 3 is an enlarged fragmentary sectional view of the upper end portion of one of the cisterns embodied in the invention, Fig. 4 is an enlarged central section illustrating the valve which governs the communication between the gas supply pipe and the upper end of each cistern, Fig. 5 is a side elevation of one of the cisterns, the building inclosing the cistern being shown in section, and Fig. 6 is a horizontal section taken on substantially line $x$—$x$ of Fig. 5.

The preferred form of construction as illustrated in the drawings comprises a filter 1 through which the beer passes from the beer cellars in which the same is stored after brewing. After passing through the filter 1, the beer passes through a pipe 2 to the cisterns 3, the pipe 2 in its passage from the filter to the cisterns passing through a tunnel 4 as shown, the filter and cisterns being separated and arranged in different buildings, as is required by law. At the far extremity of the pipe 2 is provided a valve 5 which is locked and unlocked, in the filling operation, by the Government inspector, said valve being provided with a nipple in order to adapt the same for connection with a cleaning hose for flushing and cleansing the system when the pipe 2 is not in use. Said pipe 2 communicates with the cisterns 3 by means of branch pipes 2′, said pipes 2′ passing through the lateral walls of the cisterns 3 and terminating adjacent the bottoms of the latter in such a position that the beer in entering the cisterns will be subjected to the least agitation possible in order to prevent foaming. The cisterns are shown arranged in the conventional building 6 and surrounded by the brine or cooling coils 7.

Provided adjacent the filter 1 is a relief or by-pass pipe 8 which leads from the pipe 2 back to the filter. Arranged in the pipe 8 is a relief valve 9. The valve 9 is adapted normally to remain closed, the same moving to open position only when a predetermined pressure in the pipe 2 is reached. When this predetermined pressure is reached, the opening of said valve, will allow the beer to flow from the main pipe 2 through the by-pass back to the filter. The pressure under which the relief valve 9 will open is less than the danger pressure of the cisterns and so that, with this arrangement, it will be impossible for the pressure in the pipe 2 and hence in the cisterns 3 with which said pipe communicates, to exceed the pressure at which the valve 9 will open and hence to reach the danger or unsafe pressure in the cisterns. Therefore, with this arrangement, in the event of the shutting off of the flow of beer to the cisterns, when the latter are filled, being neglected, when the pressure in the cisterns reaches the point at which the valve 9 will open, the beer will simply flow back to the filter and not to the cisterns, and so that the pressure in the latter will not be increased. This relief valve comprises a two-part casing or body 10 provided with an inlet opening 10′ and an outlet opening 10″, said openings being separated by a partition 11 through which is formed an opening 12. This opening 12 is controlled by a vertically movable valve 13 the stem 14 of which is engaged at its upper end by a helical compression spring 15 which serves to normally hold the valve 13 in closed position. A screw 16 coöperates with the spring 15 for altering the tension of said spring exerted upon said valve. The upper end of stem 14 also connects with a diaphragm 17, against which the pressure in the inlet side of the pipe 8 and hence in the pipe 2 will act, the arrangement being such that when the pressure upon said diaphragm exceeds the pressure of the spring 15, said diaphragm will be flexed upwardly causing the valve to be raised to open position. In the outlet end 10″ of the valve casing is mounted a blade 18 which normally assumes a vertical position, the passage of liquid through the outlet end 10″ causing said blade to be rocked toward a horizontal position. Connected with the blade 18 is an exteriorly positioned hand 20 whereby the position of said blade may be noted in order to advise the operator of the condition of the valve 18 and hence whether the valve 9 is open or closed. Mounted in the lower end of the valve casing 10 is a vertically movable stem 21 which is connected at its lower end with an oscillatory hand lever 22 which is fulcrumed to an arm 23. With this arrangement, the valve 13 may be manually opened, in order to permit of flushing and cleansing of the system or apparatus, when not in use, by simply rocking the hand lever 22 upwardly until the lower end of the stem 21 contacts with the valve 13 and lifts the latter from its seat.

The specific construction of the valve 9 is however not claimed in this application, this construction being made the subject matter of a companion application filed February 2, 1913, Serial No. 750,588, for relief valves.

Communicating with the lower end of each of the cisterns 3 is a drain pipe 24, through which the beer is drawn from the cisterns after inspection by the Government inspecting officials as required by law.

Coöperating with the cisterns 3 is an air pressure pipe 25 one end of which communicates with any suitable source of compressed air supply. Leading from the pipe 25 are branch pipes 26 which communicate with fittings 27 provided centrally at the upper sides of the cisterns. In each of the pipes 26 is provided a pressure regulator and stop valve 26′ of any approved design and a pop valve 26″ also of any ordinary or preferred form. Also communicating with the pipes 26 is a relief pipe 28 at one end of which is provided a pop valve 28′, this being ordinary construction. In the filling of the cisterns, pressure is maintained above the liquid introduced by the air supplied through the pipe 25 in order to prevent foaming. This pressure is maintained at a constant point through the medium of the relief pipe 28 and the pop or relief valve 28′, air being permitted to escape through said pipe and valve to correspond with the beer introduced which naturally causes displacement of air in the cisterns. The use of an air pressure pipe and the relief pipe however is old and no claim is here made thereto.

The mechanism for preventing this overflowing comprises a valve arranged in each of the fittings 27 which comprises a vertically movable stem 29 at the upper end of which is carried the valve head, said head consisting of a body 30, a cap member 31 and a retainer ring 32 which serves to hold an annular rubber member 33 in position for engagement with the valve seat 34. The arrangement is such that, when the member 33 is pressed to engagement against the seat 34, communication between the pipe 26 and the upper end of the cistern or tank will be shut off, communication between said pipe and cistern being effected only upon lowering of the valve. The lower end of the stem 29 projects through a guide 35 and is connected with an arm 36 which is fulcrumed at 37. The free end of the arm 36 carries a float 38 whereby, when the level of the liquid in the cisterns reaches a predetermined point, said float will be elevated causing movement of the valve to closing position and hence closing of communication between the cisterns and the pipe 26.

Formed through the valve member 31 is a passage 39 the lower end of which is controlled by a valve 40 which is mounted for vertical movement in the valve member 30. The stem 41 of the valve 40 loosely engages the opening provided through the lower reduced end of the member 30 and a helical compression spring 42 coöperates with said valve 40 to normally hold the same in closing position. At the lower end of the valve member 30 are provided openings 43 which communicate with the passage formed through the interior of said valve member. The arrangement is such, as will be seen, that by lowering the valve 40, communication between the pipe 26 and the interior of the cisterns may be effected although the main valve controlling the communication between said pipe and the cisterns is in closing position. The spring 42 is so tensioned that when the pressure in the cisterns drops below a predetermined point, pressure in the pipe 26 will cause said valve 40 to be opened in order to increase the pressure in the cisterns to that in the air pressure pipe. This is of advantage since with this arrangement, upon the cisterns being filled with beer, should the pressure above the beer be reduced by reason of leakage, this leakage will be compensated for and thus the pressure above the beer maintained. Coöperating with each of the cisterns is a gage pipe 44, the upper end of which communicates with the lower portion of the corresponding fitting 27, the lower end of said pipe communicating with the bottom of the cistern. The gage pipes 44 are thus uninfluenced by the valve operating in the fittings 27 and through their employment the Government inspector may ascertain the height to which the tank or cistern is filled, that is the quantiy of beer contained therein.

Interposed in the various pipes of the apparatus are Government controlled valves 45 which are locked and unlocked by the Government inspectors in ascertaining the quantity of beer manufactured in order to determine the amount of tax to be levied thereon.

With an apparatus then of the construction set forth it will be seen that provision is made for preventing an excessive pressure being developed in the beer cisterns which at the present time not infrequently results in bursting of the cisterns occasioning considerable loss and annoyance, provision being also made for preventing the overflowing of the cisterns into the air pressure and relief pipes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In an apparatus of the character described, the combination of a tank; means for feeding liquid to said tank under pressure; a compressed gas supply pipe communicating with the upper end of said tank for maintaining a pressure over the liquid introduced into said tank; means controlling the admission of gas to said tank, said means comprising a valve for shutting off communication between said tank and said gas supply when the liquid in said tank reaches a certain level; and a valve within said first mentioned valve adapted when the pressure in said tank drops below a predetermined point, with said first mentioned valve in closing position, to open communication between said gas pipe and said tank, substantially as described.

2. In an apparatus of the character described, the combination of a tank; means for feeding liquid to said tank under pressure; a compressed gas supply pipe communicating with the upper end of said tank for maintaining a pressure over the liquid introduced into said tank; means controlling the admission of gas to said tank, said means comprising a valve for shutting off communication between said tank and said gas supply when the liquid in said tank reaches a certain level; a valve within said first mentioned valve adapted when the pressure in said tank drops below a predetermined point, with said first mentioned valve in closing position, to open communication between said gas pipe and said tank; and a vent in said compressed gas supply pipe preventing excessive pressure in said tank before the liquid in the latter reaches said certain level, substantially as described.

3. In an apparatus of the character described, the combination of a tank; means for feeding liquid to said tank under pressure; a compressed gas supply pipe communicating with the upper end of said tank for maintaining a pressure over the liquid introduced into said tank; means controlling the admission of gas to said tank, said means comprising a valve for shutting off communication between said tank and said gas supply when the liquid in said tank reaches a certain level; and a spring pressed valve arranged within and carried by said first mentioned valve adapted, when the pressure in said tank drops below a predetermined point, with said first mentioned valve in closing position, to establish communication between said gas supply and said tank through said first mentioned valve, substantially as described.

4. In an apparatus of the character described, the combination of a tank; means for feeding liquid to said tank; a fitting in the top of said tank and communicating therewith; a compressed gas supply pipe connected with the top of said fitting; a valve seat in said fitting; a valve in said fitting and coöperating with said valve seat, said valve having a small valve seat in its central portion; a spring pressed valve coöperating with said last mentioned valve seat; a hollow valve stem carried by said first mentioned valve, inclosing said last mentioned valve and extending into said tank; and a float lever pivoted in said tank, connected with the end of said valve stem and adapted to operate said first mentioned valve, substantially as described.

5. In an apparatus of the character described, the combination of a tank; means for feeding liquid to said tank; a fitting in the top of said tank and communicating therewith; a compressed gas supply pipe connected with the top of said fitting; a valve seat in said fitting; a valve in said fitting and coöperating with said valve seat, said valve having a small valve seat in its central portion; a spring pressed valve coöperating with said last mentioned valve seat; a hollow valve stem carried by said first mentioned valve, inclosing said last mentioned valve and extending into said tank; a float lever pivoted in said tank, connected with the end of said valve stem and adapted to operate said first mentioned valve; and a vent in said compressed gas supply pipe permitting the escape of excessive gas from said tank during the introduction of liquid into the latter and before said first mentioned valve is closed, substantially as described.

In testimony whereof I have signed my name to this specification in the presence of two subscribing witnesses.

WILLIAM H. BEES.

Witnesses:
A. A. OLSON,
HELEN F. LILLIS.